United States Patent [19]

Dickinson et al.

[11] Patent Number: 4,987,018
[45] Date of Patent: Jan. 22, 1991

[54] JOINING POLYOLEFINIC MEMBERS BY FUSION

[75] Inventors: Alan J. Dickinson, Cramlington; Trevor G. Stafford, Whiteley Bay, both of England

[73] Assignee: British Gas plc, London, England

[21] Appl. No.: 312,846

[22] Filed: Feb. 21, 1989

[30] Foreign Application Priority Data

Feb. 19, 1988 [GB] United Kingdom ............... 8803956

[51] Int. Cl.$^5$ ............... B29C 65/10; B29C 65/18; B29C 65/20

[52] U.S. Cl. .................... 428/36.9; 138/155; 156/158; 156/304.2; 156/304.3; 156/304.6; 156/306.6; 156/309.6; 285/423; 428/212

[58] Field of Search ............... 156/158, 304.1, 304.2, 156/304.3, 304.6, 499, 507, 306.6, 309.6; 285/423; 428/36.9, 212; 138/155

[56] References Cited

U.S. PATENT DOCUMENTS

| | | | |
|---|---|---|---|
| 3,406,055 | 10/1968 | Rubel | 156/275.5 |
| 3,552,265 | 1/1971 | Lucas et al. | 156/258 |
| 3,927,233 | 12/1975 | Naidoff | 428/58 |
| 4,076,282 | 2/1978 | Scott, Jr. et al. | 285/423 |
| 4,770,735 | 9/1988 | Shaposka et al. | 156/304.6 |

FOREIGN PATENT DOCUMENTS

| | | |
|---|---|---|
| 2026193 | 1/1971 | Fed. Rep. of Germany . |
| 58-029617 | 2/1983 | Japan ............... 156/304.2 |

*Primary Examiner*—Michael G. Wityshyn
*Attorney, Agent, or Firm*—Larson and Taylor

[57] ABSTRACT

Members especially hollow members 10, 12 such as pipes and pipe fittings one member 12 of cross-linked polyethylene say and the other member 10 of medium density polyethylene say are joined by fusion using a butt fusion machine. End surfaces of the members are pressed at higher pressure against a hot plate 18 to upset only the medium density material to form beads 20, 22. No cross-linked material is upset to form beads. The pressure is reduced during a soak stage then the plate is removed and the surfaces are mutually engaged at the higher pressure. The beads formed are adjacent the interface between the members and both beads are offset towards the medium density material, member 10. Careful alignment will avoid faults caused when the beads do not cover exposed parts of end surfaces. Other materials include polypropylene, copolymer or monopolymer types. Natural gas distribution systems can be fabricated using the invention.

8 Claims, 2 Drawing Sheets

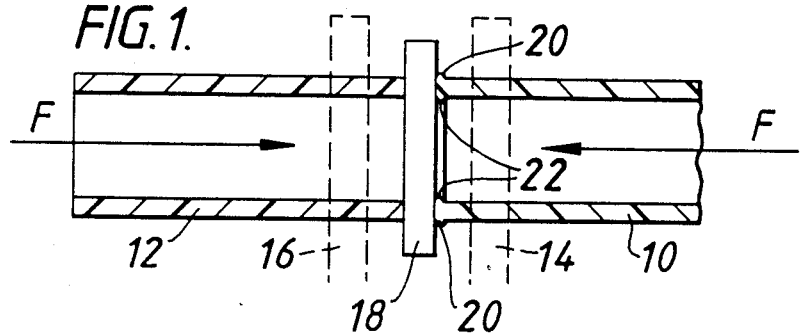
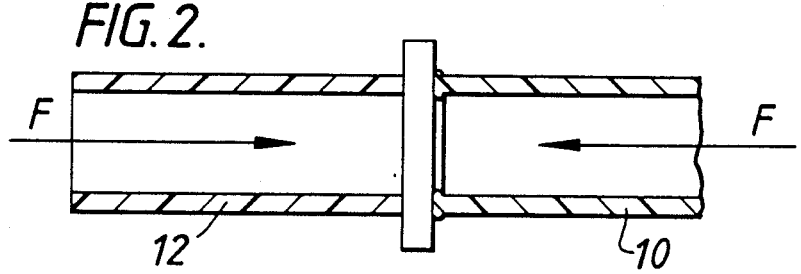
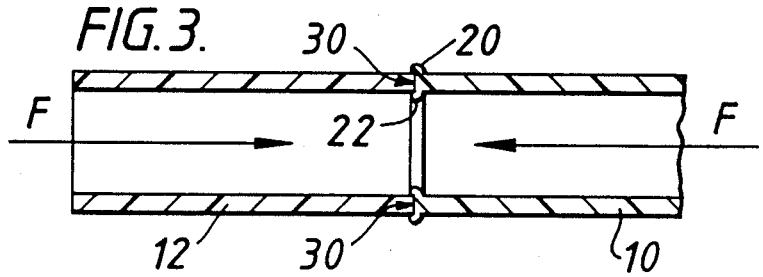
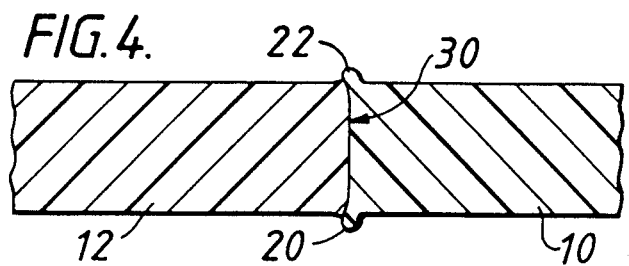

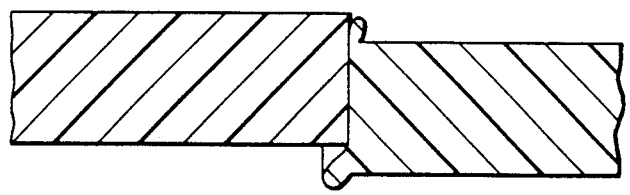
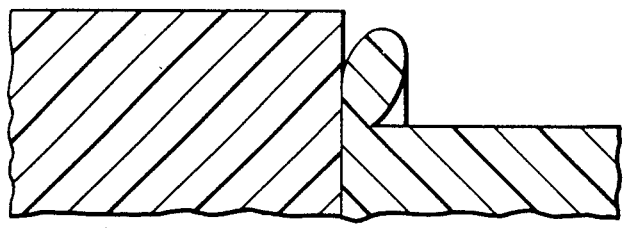
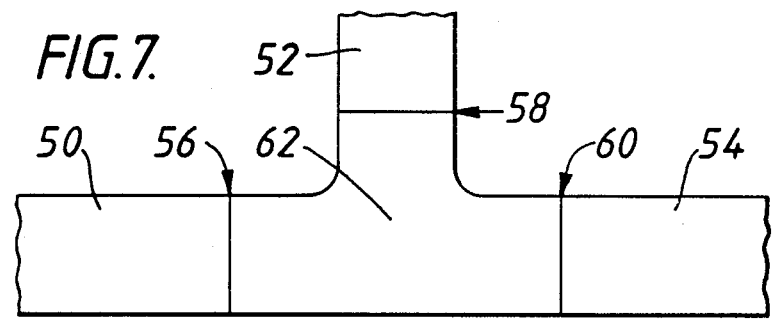
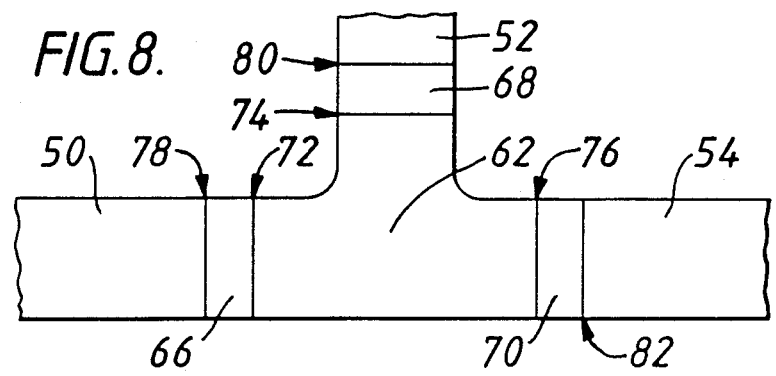

JOINING POLYOLEFINIC MEMBERS BY FUSION

The invention relates to joining polyolefinic members by fusion particularly though not exclusively pipes and fittings for systems for gas or water distribution or waste disposal.

The joining of polyolefinic members such as pipes of polyethylene by fusion to make systems such as distribution pipe systems for natural gas is well known. It is common for relatively small diameter fittings for use in polyolefinic pipe systems to be made by injection moulding the polyolefinic material such as polyethylene. Injection moulding grades of polyethylene are medium and high density grades which inherently possess properties which meet the requirements of high integrity pipe systems. However, at present, no larger diameter fittings e.g. bends, elbows, T-pieces, valve bodies etc are made from polyolefinic material. This is because it is not economical to use injection moulding to make such fittings.

For gas distribution for example all pipes and fittings must conform to a standard specification which imposes high performance criteria on the pipes and the fittings and also on all the joints and jointing methods used to join the pipes and fittings in the pipe system.

The forming of components by rotational moulding is very well known and is readily applicable to the forming of fittings of the kind referred to above. However, moulding grade polyethylene does not have the inherent properties which would enable fittings formed from such material to meet the criteria imposed by the specification for gas distribution systems, nor, generally, would such fittings meet the requirements of specifications for water distribution or waste disposal.

Techniques are known by which the properties of components made by moulding polyolefinic materials can be modified. Such techniques include irradiation of the component and the use of active agents included with the polyolefinic material in the mould. The use of such techniques necessarily reduces the Melt Flow Index (MFI) of the material, which term as used herein has the meaning given by the test defined in British Standard 2782 method 720A:1979: Determination of melt flow rate for thermoplastics under the conditions of temperature of 190° Centigrade and load of 21.2 Newtons, the rate or index being expressed in gram per 10 minutes.

The joining of polyolefinic members by butt fusion welding is well known. It is performed by heating end faces of the members, and forcing the heated faces together. It is known that in such welding it is essential for both members to be composed of material which has an MFI which is sufficiently great that under the applied load material is displaced from each member to form a bead at each side of the member. The beads displaced from the two members generally join together, adjacent the common interface, at each side of the members. As commonly practised, the two members are composed of identical materials. In the case of joining polyethylene pipes to fabricate a natural gas distribution pipe system, for example, the material of the pipes as used by British Gas is medium density polyethylene (MDPE) having an MFI of 0.3. By contrast MDPE having an MFI of 0.9 to 1.3 for example is used in the USA. High density polyethylene (HDPE) pipe is commonly used to fabricate natural gas distribution systems abroad. Typically the MFI of such HDPE is 0.1 to 0.5.

It is not known to attempt to join polyolefinic members by fusion welding where either one or both is composed of material having an MFI of zero or so low a value that the flow capability of the material under the welding conditions is negligible.

The known butt fusion welding technique therefore imposes severe limitations on the development of methods of making fabrications such as fittings based on rotational moulding of polyolefinic material and also imposes limitations on methods of making fabrications such as polyolefinic pipe systems.

Such limitations arise from the fact that any use of techniques to modify and enhance the properties of a rotationally moulded component must be restricted, because the MFI of the component must not be decreased below the known value at which a sound joint between the component and some other member can be made by butt fusion.

The effects of such limitations are apparent from the disclosure in British patent application No. 8710785 publication Ser. No. 2190037. In that publication it is proposed to modify the properties of a rotationally moulded polyethylene component such as a pipe fitting by the use of active agents included with the polyethylene in the mould. The moulding grade polyethylene is a low density (0.870 to 0.970 grams per cubic centimeter, but preferably 0.93 to 0.95 g per cc) material having an MFI between 1.0 and 40.0. At the end of the moulding stage the properties of the polyethylene in the moulded component have been modified, the MFI having decreased to between 1.0 and 0.01 but preferably between 0.4 and 0.1. The preferred range includes the value of 0.3 quoted above as the typical value for MDPE, the British Gas pipe material.

However, the modification of the properties of the component clearly had to be limited in order to ensure a desired MFI value sufficiently high to enable fusion welding.

The publication suggests that the component as moulded would in fact only be a precursor and would require further processing. An example is given using a further technique in which the component is joined to short lengths of pipe by welded joints and then the component including the joints is irradiated further to enhance its physical properties by cross-linking. The free ends of the short lengths of pipe are not irradiated so that they can be welded to system pipes. That further technique is the subject of British patent application No. 8719397 publication Ser. No. 2196009.

Clearly, in order that required properties may be fully established, the as-moulded component required post-treatment and its properties were not such that it could be directly joined to the pipes in the field by fusion welding according to the known method. On the contrary, the joining of the cross-linked material by fusion welding to the system pipes was regarded as impossible. The component had to be joined to the short pipe lengths first, before any cross-linking occurred, and the free ends of the short pipe lengths had to be kept free of cross-linking. The butt fusion welded joints were not such as to have full performance capability without post-treatment by irradiation.

MFI values of zero or extremely low MFI values are associated with cross-linked material. However, extremely low or zero values of MFI can arise in polyolefinic material owing to properties other than cross-linking, such as high molecular weight for example.

Material which has an MFI of zero or of extremely low value has little or no capability to flow. That is why known fusion welding methods could not be used to join such material to other material. However, the present invention overcomes that limitation and enables such material, conventionally regarded as impossible to join by fusion to other material, to be successfully joined to other material.

According to the invention a method of joining by fusion first and second members composed respectively of first and second materials comprises heating respective surfaces of said members, engaging the heated surfaces with each other in mutual alignment at an interface and pressing said surfaces against each other, said second material having an MFI of zero or of extremely low value and only said first material being upset to form beads.

Preferably, said surfaces are heated by being pressed against respective faces of a heater means under pressure.

Typically, for example, the first member is a polyethylene pipe or pup and the second member is a fitting composed of polyethylene which has been moulded and modified.

Embodiments of the invention will now be described by way of example with reference to the accompanying drawings in which:

FIGS. 1 to 3 are diagrammatic longitudinal sections through two members in the form of pipes at different stages in the method;

FIG. 4 is a diagrammatic detail on an enlarged scale of part of a welded joint between the members shown in FIG. 3;

FIG. 5 is a diagrammatic detail on an enlarged scale of part of a joint showing the effect of misalignment of the members;

FIG. 6 is a diagrammatic detail on an even further enlarged scale of part of the detail shown in FIG. 5; and FIGS. 7 and 8 are diagrammatic representations of parts of pipe systems fabricated using the invention.

FIG. 1 shows a first stage in joining first and second hollow members 10, 12 of polyethylene, for example, by fusion. The members are shown purely for the sake of illustration as cylindrical pipes having the same internal and external diameters. The pipes, or one of them at least, could be hollow members such as fittings or short pipe lengths such as pups described below. The pipe 10 is, for example, of medium density polyethylene. The pipe 12 is, for example, cross-linked polyethylene. The pipes 10, 12 are gripped by respective clamps 14, 16 of a butt fusion machine which includes a retractable heater means in the form of an electrically heated plate 18. The ends of the pipes 10, 12 had previously been cut square and ensured to be clean. The clamps 14, 16 are positioned sufficiently close to the ends of the pipes 10, 12 to ensure that the end surfaces of the pipes 10, 12 are kept accurately in alignment.

The plate 18 has opposite faces which are kept at the same constant temperature. The value of that temperature is preferably selected from the range 190°–220° Celsius. The end surfaces of the pipes 10, 12 are pressed against respective faces of the plate 18 during the bead-up stage shown in FIG. 1 under forces F. Typically, for example, the butt fusion machine includes a hydraulic cylinder which forces one clamp towards the other, the plate 18 being free to move along the machine. The required force F is thus directly created and applied to one pipe and the other is held in a fixed clamp which thus causes an opposing reaction F to be applied to the other pipe, as is well-known in the use of such machines.

By way of example, the pressure between the end surfaces of the pipes 10, 12 and the plate 18 in the bead-up stage is held constant at a value in the range 0.1 to 0.2 mega-Newtons per square meter ($MN/m^2$) and the force F is the product of the pressure and the area of the end surface. The bead-up stage lasts for approximately 30 seconds. The material of the first pipe 10 softens as it is heated and the force F pushes the pipe 10 towards the plate 18 as the first pipe material is upset and displaced both externally and internally to form initial beads 20, 22, respectively.

No cross-linked material of the second pipe 12 is upset to form beads, although some slight bulging may occur. Such deformation probably enables the pipe 12 to make full contact at the interface 30 between the pipe 12 and the pipe 10. Once the bead-up stage is completed a heat soak stage ensues for a period of, for example, 3 minutes. In this stage the pressure between the pipes and the plate is reduced by a factor of 10 to bring it to a constant value in the range 0.01 to 0.02 $MN/m^2$ (FIG. 2).

At the end of the soak stage, the pipe clamps 14, 16 are separated and the plate 18 is withdrawn. The clamps 14, 16 are brought together again to engage the end surfaces of the pipes 10, 12 mutually at an annular interface 30 (FIGS. 3 & 4) to begin a fusion stage. Typically, for example the period between the end of the soak stage and the start of the fusion stage (the plate removal stage) is 10 seconds. During the fusion stage the end surfaces of the pipes 10, 12 are pressed together under the same pressure as was applied during the bead-up stage. The fusion stage lasts typically for 10 minutes.

At the fusion stage, the beads 20, 22 are completed by some further upsetting of the material of the pipe 10. However, no upsetting of the material of the pipe 12 to form beads occurs during the fusion stage or at any other time. Some slight bulging of a very minor nature might occur in this stage but is not significant.

Once the fusion stage has been completed the force in the cylinder of the butt fusion machine is discontinued to eliminate the applied pressure. The pipes cool but they are held in the clamps 14, 16 for a further period of, say, 10 minutes while the joint cools completely. Then the clamps are released from the joined pipes 10, 12.

The beads 20, 22 are formed entirely by upset material of the medium density polyethylene pipe 10. It is not yet fully clear to the Applicants how a satisfactory joint is achieved by the invention. Apparently, an interface structure is formed which enables fusion to occur. The interface structure apparently arises at the cross-linked material side of the interface i.e. at the side toward the pipe 12. It is important to ensure that the end surfaces of the members are accurately aligned, otherwise the bead does not cover the exposed edge of the cross-linked material (FIGS. 5 and 6).

The result is a sharp defect of slit-like form which makes the joint unacceptable. However, accurate alignment is readily achieved by attention to the positioning of the clamps 14, 16 in relation to the end surfaces of the pipes.

Although the joined members in FIGS. 1 to 6 are shown as pipes the invention is applicable as already mentioned to the joining of other kinds of member. For example, the member of cross-linked material can be a fitting such as a valve body, bend, T-piece (FIGS. 7 and 8) or the like, which has been moulded by rotation moulding of rotation moulding grade polyethylene. Such material has a relatively low toughness and is not strong enough to meet pipeline specifications for distribution of fluids e.g. natural gas under pressure. However, after a property or properties of the material have been modified by a process conducted in the mould (e.g. a silane or a peroxide process) or by irradiation, a suitable property e.g. toughness is reached. The member of medium density polyethylene may be a short length of pipe (known as a pup) which is joined to a corresponding spigot or end of the fitting using the invention in a factory. The fitting with its pup, or pups, joined to it can then readily be joined to medium density polyethylene piping in the field using standard butt fusion procedures to form joints between the free ends of the pups and the pipes. Thus, a distribution system, say, which meets specifications for toughness throughout can be fabricated.

Further examples of the use of the invention are described below with reference to FIGS. 7 and 8.

The invention can be used to join members other than hollow members, for example to join slabs or sheets of polyolefinic material or other sections.

The invention is applicable to polyolefins other than polyethylene such as polypropylene members. The terms polyethylene and polypropylene have meanings commonly in use so as to embrace both single polymer forms and also co-polymer forms. Thus, for example the term medium density polyethylene is commonly applied to a material which is in fact a complex form of material made up of two different polymers and normally called a copolymer of ethylene and other materials.

FIG. 7 shows part of a natural gas distribution system in which extruded MDPE pipes 50, 52, 54 are joined by butt fusion joints 56, 58, 60 respectively to spigot formations of a fitting in the form of a T-piece 62. The pipes 50, 52, 54 typically for example have an outside diameter of 315 mm and a wall thickness of 18 mm. The material of the pipes has an MFI of 0.3, for example.

The fitting 62 is formed by rotational moulding from rotational moulding grade polyethylene typically having an MFI of say 12.

The properties of the material of the fitting would be modified to give the full performance capability required by the specification of the pipe system. Such modification would be achieved for example by irradiating the moulded fitting using gamma radiation or electron beam radiation so as to cross-link the polyethylene. The final fitting has an MFI of zero, typically.

The invention advantageously enables the full performance capability of the fitting to be provided in a single unitary moulding, since the pipes can be directly joined to the fitting 62 by butt fusion joints made in the field using the method according to the invention. The joints are made using a butt fusion machine of known type.

FIG. 8 shows part of a similar system in which pups 66, 68, 70 are joined by butt fusion joints 72, 74, 76 respectively to the spigot formation of the fitting 62. The pipes 50, 52, 54 are joined by butt fusion joints 78, 80, 82 respectively to the pups, which are of extruded MDPE the same as the pipes.

The joints 72, 74, 76 are made using the invention in the factory. The invention enables the fitting 62 to be made as a single unitary moulding as before with its full performance capability before the pups are joined to it. No post-treatment of the joints 72, 74, 76 by irradiation say is necessary.

The joints 72, 74, 76 are made using the invention between the pups as first members having an MFI of 0.3 and the fitting 62 which is cross-linked as before and has an MFI of zero as second member. The fitting is upset to a negligible degree. The joints 78, 80, 82 are butt fusion joints made in the field between identical materials both with MFI of 0.3. Beads are displaced from both the pipe and the pup and the welding procedure is entirely conventional.

The modification of the properties of the material of the fitting can be effected by a silane or peroxide process in the course of moulding instead of using radiation if preferred. The modification can be such as to increase the molecular weight, if preferred.

As an alternative to MDPE, the pipes may be composed of HDPE, for example.

Instead of using a heated plate to heat the surface of the members to be joined, it is possible to use other ways of heating the surfaces. For example, the surfaces can be heated by passing hot air or other gas over them or by some other method of non-contacting heating, such as by means of a radiant heater.

We claim:

1. A method of joining by fusion first and second members composed respectively of first and second polyolefinic materials comprising heating respective surfaces of said members while said respective surfaces are separated from one another by means of a source of heat placed opposite to each said surface, removing the source of heat, engaging the heated surfaces with each other in mutual alignment at an interface and pressing said surfaces against each other, said second material having an MFI of zero or of extremely low value and only said first material being upset to form beads.

2. A method according to claim 1, wherein said surfaces are heated by being pressed against respective faces of a heater means.

3. A method according to claim 1 wherein said first member comprises a polyethylene pipe or pup and said second member comprises a fitting composed of polyethylene which has been molded and modified by a process by which toughness is introduced into the polyethylene.

4. Members joined by the method according to claim 1.

5. A pipe system comprising pipes and fittings, the pipes being joined as first members to the fittings as second members by butt fusion joints made in the field by the method according to claim 1.

6. A method of joining by fusion first and second members composed respectively of first and second polyolefinic materials comprising heating respective surfaces of said members while said respective surfaces are separated from one another by means of hot gas which is passed over the separated said respective surfaces, discontinuing the passage of hot gas, engaging the heated surfaces with each other in mutual alignment at an interface and pressing said surfaces against each other, said second material having an MFI of zero or of extremely low value and only said first material being upset to form beads.

7. A method of joining by fusion first and second members composed respectively of first and second polyolefinic materials comprising heating respective surfaces of said member while said respective surfaces are engaged with each other in mutual alignment at an interface by non-contact heating comprising passing radiant energy into said respective surfaces, and pressing the heated surfaces against each other, said second material having an MFI of zero or of extremely low value and only said first material being upset to form beads when said surfaces are pressed together.

8. A fitting including a pup joined to the fitting by a butt fusion joint made using the method according to claim 7, said fitting being composed of said second material and said pup being formed of said first materials which on being upset forms beads.

* * * * *